United States Patent Office 2,903,408
Patented Sept. 8, 1959

2,903,408

PARAFFIN WAX COMPOSITION OF IMPROVED GLOSS STABILITY

Hallard C. Moyer, Homewood, Ill., assignor to Sinclair Refining Company, New York, N.Y., a corporation of Maine No Drawing. Application August 29, 1955
Serial No. 531,252

3 Claims. (Cl. 208—21)

This invention relates to crystalline wax compositions. More particularly the present invention is concerned with paraffin wax compositions of improved gloss stability containing a select petroleum fraction.

The major portion of paraffin wax produced today is consumed by the paper industry as a material for coating or impregnating paper or paperboard products. One property of paraffin wax films which is of special importance in many of these coatings is the ability to maintain a high gloss, thus enhancing the appearance and sales appeal of the product involved. Coatings having good initial gloss can normally be prepared by applying a film of wax at a temperature well above the melting point and cooling very rapidly by immersion in cold water. However, waxed paper or paperboard having good initial gloss often loses this gloss after a few days or weeks. A method for readily modifying wax to prevent loss of gloss on aging is therefore of value, particularly if the functional properties of the wax are not adversely affected to a material extent.

It has been found that incorporation of a small amount of a select petroleum fraction results in marked improvement in gloss retention properties of commercially produced crystalline waxes. Waxes so modified have also shown improved stability toward oxidation (odor formation) and have afforded films of somewhat improved blocking resistance, slip, and water vapor impermeability. These advantageous results are achieved by my new compositions of crystalline wax containing a small but effective amount of a defined select petroleum fraction to improve gloss stability.

The select petroleum fraction which is incorporated in crystalline wax to produce compositions of my invention is a low melting waxy material obtained from raw petrolatum by deoiling and is characterized by an average molecular weight of about 800 to 1100, an API gravity of about 27 to 31 degrees and a pour point of about 65 to 85° F. While it is recognized that the chemical constitution of petroleum fractions generally is not of definitive nature it is believed that the select petroleum fraction contains, on a per molecule basis, about 2 to 3 naphthenic rings, about 0.5 to 1.0 aromatic ring, and its carbon content is about 75 to 83 weight percent paraffinic carbon, about 10 to 16 weight percent naphthenic carbon and about 5 to 12 weight percent aromatic carbon (n-d-m method, "Aspects of the Constitution of Mineral Oils" by van Nes and van Westen). Although the select petroleum fraction is a fraction of petrolatum, it does not contain the characteristic higher molecular weight microcrystalline waxes, as these have been excluded by refining operations. When fractionated into 10% cuts, the highest melting point cut of the select petroleum fraction normally will not have a melting point above about 95° F. And this exclusion is necessary since higher melting microcrystalline waxes have been found in many instances to have a detrimental effect on gloss, blocking and slip properties of subsequent blends.

The select petroleum fraction constituting the additive employed to produce my new compositions advantageously is obtained from the raw petrolatum resulting upon low temperature filtration of a ketone-toluene solution of a deasphalted and/or deresined residual lubricating oil stock. The raw petrolatum is solvent deoiled according to usual procedures, preferably with a 50:25:25 solution of methylethyl ketone, benzene and toluene, and by control of the quantity of solvent employed a fractionation of the raw petrolatum can be effected. The select petroleum fraction appears in the solvent and is recovered by removing the solvent, for example by distillation. Raw petrolatum can be considered to consist broadly of microcrystalline wax, occluded oil and waxy materials having compositions intermediate that of the microcrystalline wax and occluded oil. The lowest melting fraction of these waxy materials constitutes the select petroleum fraction to be used in my invention. As pointed out above, the exclusion of the higher melting microcrystalline waxes is necessary; accordingly in fractionating the petrolatum, conditions, i.e. quantity of solvent and temperature, are chosen with a view to obtaining maximum yield possible of the waxy materials consistent with exclusion of the microcrystalline wax. Maximum yields of this fraction which can be obtained from a Pennsylvania base raw petrolatum appear to be about 25 weight percent; from a Mid-continent base raw petrolatum, about 12 percent yields appear to be maximum. This procedure of adjusting conditions to yield, of course, results in the occluded oil being obtained along with the desired fraction. Occluded oil is not harmful except that it acts to dilute the desired fraction and, in blends with crystalline wax, raises oil content without contributing proportionately to gloss improvement. When the occluded oil content is too large to be tolerated, for example, where it would upset oil-content specifications, it can easily be removed to the desired extent by subjecting the select fraction to further solvent deoiling by conventional procedures.

The select petroleum fraction is employed in a small but effective amount to improve the gloss retention properties of the wax. About 0.1 to 1.0 percent or more of the additive, based on the crystalline wax, is used to special advantage; a more preferred amount is about 0.2 to 0.5 percent. The optimum amount is determined by such considerations as oil content, softening effects and in some cases, tensile strength of the resulting compositions. The select petroleum fraction is incorporated in crystalline wax most easily by raising the temperature of the wax and the fraction until melted, for example to about 145 to 175° F., i.e. 150° F., and then stirring together and permitting to cool. As a generality, crystalline waxes are given a final treatment with activated minerals or clays to remove undesirable constituents and impurities and thus insure requisite color and odor. For purposes of the present invention the wax and additive are preferably blended prior to this final treatment in the wax refining operations although each component may be finished separately and then be blended if desired; the preferred procedure insures that incorporation of the additive will not deleteriously affect the color or odor of the end product wax. One of the important advantages of the present invention lies in the fact that the select petroleum fraction can undergo the necessary wax refining operations in conjunction with the wax without being removed or rendered ineffective; many other gloss improving additives, especially highly aromatic and naphthenic type additives, would generally be removed and/or rendered ineffective by this procedure.

Crystalline waxes, which are the major or base constituents of compositions constituting my invention, are known articles of commerce sold annually in very large quantities. Crystalline waxes occur in petroleum oils in a wide range of molecular weights, melting points and other physical properties and by choice of various refining procedures wax fractions of many combinations of properties can be obtained. Order has been introduced into this maze of possible wax fractions by the establishment of standard sets of properties for various fractions by the ASTM; these standard wax fractions are now commonly identified by their melting points, i.e. 135/37° F. M.P., 125/27° F. M.P. and so on. While the present invention is applicable to crystalline wax fractions in general, I prefer to practice the invention while employing the particular fractions identified by the ASTM melting points. Broadly crystalline wax fractions having ASTM melting points of about 120 to 145° F. or more constitute the preferred waxes; particularly satisfactory results have been achieved with the 135%/37° F. melting point wax.

The compositions have been described as containing crystalline wax and defined amounts of the select petroleum fraction as an additive. It should be understood that other materials such as anti-oxidants and the like can be included in the compositions in the usual amounts to impart special characteristics so long as the gloss stability of the compositions of the present invention are not deleteriously affected.

The invention will be described further in conjunction with the following example. The details disclosed are not to be considered as limiting the invention.

EXAMPLE

Raw petrolatum, obtained from deresined Pennsylvania base residuum stock, containing about 5.5 percent oil, having a melting point of 123° F. and a cone penetration of 96 at 77° F. was added ot a solution containing 50 volume percent methylethyl ketone, 25 volume percent toluene and 25 volume percent benzene, in a ratio of one part of the petrolatum per 10 parts by volume of the solution at a temperature of 150° F. At this temperature complete solution of the petrolatum occurred. The resulting solution was cooled to 25° F. while agitating, at which temperature intermediate and higher melting point waxes crystallized. The mixture was then filtered through a canvas disk filter and the resulting cake was washed with five volumes of the solvent. The collected filtrate and wash solvent were distilled to remove solvent, and the select petroleum fraction recovered as distillant. This material had an average molecular weight of 950, and an API gravity of about 29.7° and a pour point of about 70° F. Blends of this fraction with fully-refined crystalline petroleum waxes were prepared by mixing at a temperature at 150° F. The resulting blends were percolated as a liquid through activated bauxite to remove color and odor forming bodies, and then permitted to cool to room temperature. The blends were then tested with the following data being obtained:

Table

| Wax Composition | Coated Paper Gloss [1] | | Coated Paperboard Gloss [1] | | Percent Oil D-721-53T | Needle Penetration at 100° F. mm.×10 per 100 G. per 5 sec. D1321-54T |
|---|---|---|---|---|---|---|
| | 0 days | 7 days | 0 days | 7 days | | |
| Wax "A" 136.8° F., ASTM, M.P. | 93 | 93 | 94 | 78 | 0.04 | 36 |
| Wax "A," +0.25% Additive | 96 | 96 | 93 | 91 | 0.15 | 37 |
| Wax "A," +0.50% Additive | 96 | 98 | 94 | 93 | 0.22 | 40 |
| Wax "A," +0.75% Additive | 98 | 98 | 93 | 95 | 0.34 | 40 |
| Wax "B," 135.8° F., ASTM, M.P. | 95 | 80 | 95 | 81 | 0.20 | 38 |
| Wax "B," +0.25% Additive | 95 | 96 | 94 | 91 | 0.20 | 40 |
| Wax "B," +0.50% Additive | 96 | 97 | 94 | 94 | 0.31 | 42 |
| Wax "B," +0.75% Additive | 96 | 98 | 94 | 95 | 0.33 | 43 |

[1] Gardner 75° glossmeter.

These data show that with the higher metling point wax "A" the incorporation of the select petroleum fraction improved the gloss of wax coated paper from 3 to 5 units and this high gloss remained throughout the seven day test. Wax "A" alone as a coating for paperboard and wax "B" alone as a coating for paper or paperboard are not satisfactory in view of the large decrease in gloss through a period of seven days. Upon incorporation of the additive into these waxes the original high gloss was retained almost to the extent of 100% of the original gloss throughout the seven days in most instances, and to an improved extent in the case of coated paper. The oil content and needle penetration data show that the additive did not affect these properties to the point where specifications could not be met with ease.

I claim:
1. A composition consisting essentially of a crystalline petroleum wax and a small but effective amount of a fraction of petrolatum characterized by a molecular weight of about 800 to 1100, an API gravity of about 27 to 31 degrees and a pour point of about 60 to 85° F. to improve the gloss stability of the crystalline wax, the highest melting point 10% cut of said petrolatum having a melting point not above about 95° F.

2. A composition according to claim 1 wherein said crystalline wax has an ASTM melting point of about 120 to 145° F.

3. A composition according to claim 2 wherein said petrolatum fraction is present in an amount of about 0.1 to 1.0 weight percent based on the wax.

References Cited in the file of this patent

UNITED STATES PATENTS

| | | |
|---|---|---|
| 190,122 | Budd | May 1, 1877 |
| 662,695 | Lichenstadt | Nov. 27, 1900 |
| 1,634,002 | Tom | June 28, 1927 |
| 1,902,489 | Clark | Mar. 21, 1933 |
| 2,015,739 | Winming | Oct. 1, 1935 |
| 2,374,127 | Peterson et al. | Apr. 17, 1945 |
| 2,703,292 | Knox | Mar. 1, 1955 |
| 2,753,275 | Wiles et al. | July 3, 1956 |

FOREIGN PATENTS

| | | |
|---|---|---|
| 450,935 | Italy | Aug. 19, 1949 |